Nov. 12, 1957 — L. A. LOFFTUS ET AL — 2,812,776

VALVE

Filed Jan. 8, 1953

INVENTORS.
LEROY A. LOFFTUS
RUSSEL E. PRENTICE
BY H. W. Breleford
ATTORNEY

United States Patent Office 2,812,776
Patented Nov. 12, 1957

2,812,776

VALVE

Leroy A. Lofftus and Russell E. Prentice, Glendale, Calif., assignors to Hycon Mfg. Company, Pasadena, Calif., a corporation of Delaware Application January 8, 1953, Serial No. 330,305

2 Claims. (Cl. 137—625.27)

This invention relates to valves and has particular reference to a two way atmosphere-to-vacuum valve that has a small lost air volume during change over from atmosphere to vacuum.

This invention is especially useful where the source of subatmospheric pressure is of limited capacity. Such limited capacity occurs, for example, on aircraft or other vehicles because of size and weight limitations on the vacuum pump. It is desirable therefore that atmosphere-to-vacuum valves for operating various instruments and mechanisms make the change over from atmosphere to vacuum with a very small lost volume within the valve. While such a characteristic is readily obtainable with valves of various constructions, in most of these there are a number of moving parts giving rise to short service life, leakage dangers and high construction cost. This invention, by contrast, provides a fast acting valve of large capacity flow, very small lost air volume, and a minimum of moving parts.

It is a general object, therefore, to provide an improved double acting vacuum and atmosphere valve.

Another object is to provide a double acting vacuum valve that has a low cost volume during change over.

Still another object is to provide a solenoid vacuum to atmosphere valve having large capacity and fast action.

Figure 2:
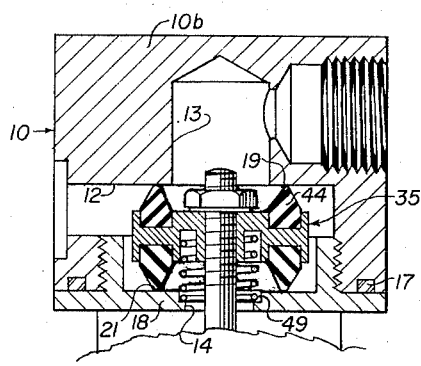
Figure 3:
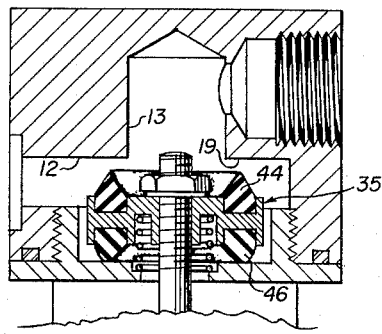
Figure 4:
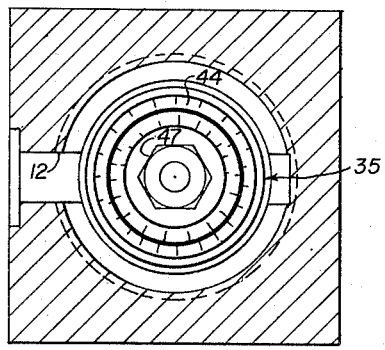
Figure 1:
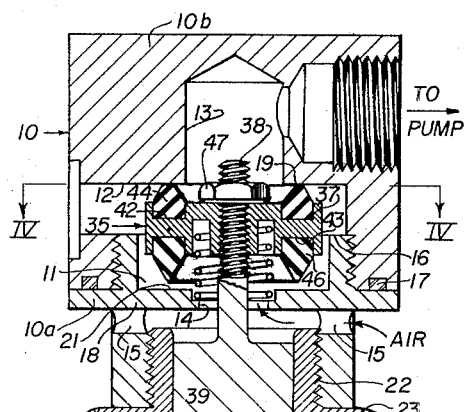
Figure 1:
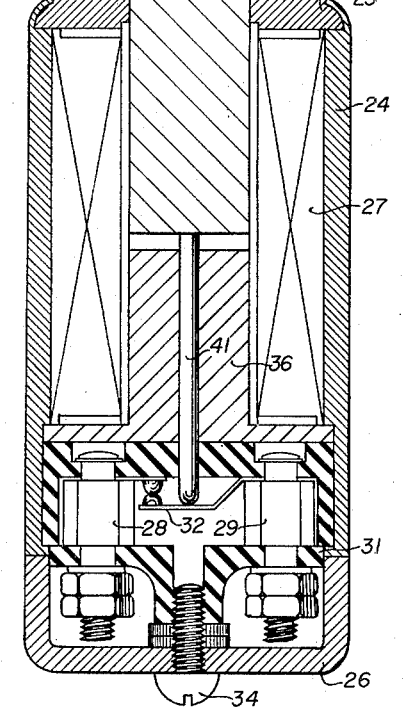

Other objects and advantages of the invention will be apparent in the following description and claims considered together with the accompanying drawing forming an integral part of this application and in which:

Fig. 1 is an elevation view in full section of the assembled valve incorporating the invention together with a solenoid actuator for the same, Fig. 2 is a sectional view of the valve portion of Fig. 1 showing the movable element of the valve in a midposition of operation, Fig. 3 is a view in full section of the valve portion of Fig. 1 showing the valve in a position to apply vacuum to the work port, and Fig. 4 is a sectional view along the line IV—IV of Fig. 1.

Referring to the drawings, a valve housing 10 may have a valve chamber 11 formed therein with which may communicate a work port 12, a vacuum port 13 and an atmosphere port 14. The valve housing may be formed in two parts, if desired, by means of a flanged tube 10a threaded into a block member 10b as at 16. The joint of the flanged tube 10a with the block may be sealed against leakage by an annular seal 17 disposed in a groove. The flanged tube 10a may have a restriction 18 upon which an annular atmosphere seat 21 may be formed. The portion of the block 10b about the vacuum port 13 may act as an annular seat 19 for that port. Apertures 15 may admit atmospheric air to the port.

The flanged tube 10a may also act as a mount for the actuating motor for the valve. The projecting end may be internally threaded at 22 to receive the threaded end of an apertured solenoid cap 23 to which may be secured a solenoid cylinder shell 24 capped in turn by a bell 26. A double wound tubular winding 27 may be energized from a plurality of terminals, two of which 28 and 29, may be mounted on an insulator 31. One winding may be connected between the two terminals 28 and 29, and the second winding may be normally connected through switch 32 in series to same two terminals. A threaded bore in the insulator may receive a bell screw 34 to retain the bell. A stationary bored stub core 36 of magnetic metal may project about half way into the windings.

Considering now the construction of the movable part of the valve, herein referred to as the movant element and designated by numeral 35, it will be noted that it is simply constructed of a minimum number of parts. A plunger 37 may be threaded on a threaded stem 38 which in turn is secured to a movable magnetic core or armature 39. A rod 41 connected to the armature 39 may pass through the stub core 36 to open the normally closed switch 32. The plunger 37 may contain oppositely disposed annular grooves 42 and 43 in which may be disposed respectively a vacuum ring seal 44 and an atmospheric ring 46. The ring seals 44 and 46 may be generally triangular in cross section on the effective part, the part that projects above the groove. A nut 47 may lock the plunger 37 at the selected position on the stem 38 and a washer may seal the thread joint between the stem 38 and the plunger 37. A compression spring 49 may bear against the plunger to normally seat the vacuum ring seal.

These ring seals are resilient and may be made from a suitable rubber or rubber-like material. The ring seals may be bonded or vulcanized in their grooves to prevent leakage and also to retain the seals in place. While various resilient materials may be used for the ring seals 44 and 46, for aircraft use silicone rubber has been found satisfactory as it retains elasticity and resiliency at low temperature, resists oil and lubricants and bonds satisfactorily.

From the foregoing description it is apparent that the movant element 35 of the valve includes the plunger 37 and the ring seals 44 and 46. The provision of seals on opposite sides of the plunger creates a double headed movant element adapted to seat on two oppositely disposed valve seats. The seals and plunger act as a unitary structure compared to movant elements with relative movement between the parts.

The condition of the valve when supplying atmospheric pressure to the work port 12 is illustrated in Fig. 1. There the spring 49 has compressed the vacuum seal 44 creating a clearance between seal 46 and its seat 21. In this connection the term "atmospheric" refers to a pressure greater than the vacuum pressure and may actually be subatmospheric or super atmospheric depending upon the environment in which the valve operates. The triangular cross section of seal 44 permits expansion of the triangle apex with a minimum of force, giving rise to a fast valve action.

Illustrated in Fig. 2 is the midpoint of the operation cycle in either direction. In the expanded, free, or rest position of the seals the dimension parallel to the path of movant travel is slightly greater than the distance between the seats 19 and 21, creating an interference fit. While moving to connect vacuum to the work port 12, the movant element never permits flow from the atmosphere port to the vacuum port, thus positively insuring no waste pumping by the vacuum source. While an interference fit is presently desired, this same economy of vacuum source load may be obtained with an overall movant dimension substantially the same as the seat spacing, especially in fast moving valves.

Figs. 2 and 3 show the total lost volume of the valve. In Fig. 2 it will be noted that at the midpoint air is trapped between the exterior of the movant element 35 (plunger 37 and seals 44 and 46) and the valve chamber 11. This, then, is the measure of the lost air volume, placing a minimum load on the vacuum source, and in actual practice placing a very small additional load on the source compared to scavenging the conduits leading from the work port to the operated machine or mechanism.

Illustrated in Fig. 3 is the position of the movant element when the vacuum port 13 is connected to the work port 12. The seal 46 is sufficiently compressed to permit clearance between the vacuum seal 44 and its seat 19. The use of ring seals seating outside the port gives rise to a large volumetric capacity for the valve resulting in extremely fast action. The actuation to the position shown in Fig. 3 is by means of the solenoid motor 27—39. When electric current is applied to the terminals of the double winding 27, it is energized, attracting the armature 39 which immediately shifts to contact stub core 36. At the same time the rod 41 opens switch 32, stopping current through one of the windings, reducing the power required for holding the valve in the position of Fig. 3. In one type of valve constructed for aerial camera control of the film platen, the actuating current was 4.0 amperes and the holding current was .2 ampere, by virtue of this switch operation.

In operation the compression spring 49 normally seals off the vacuum port 13 as illustrated in Fig. 1. This acts also as a safety feature in the event of power failure, conserving the vacuum supply. In the position illustrated in Fig. 1 air may pass through the apertures 15, through the port 14, thence into chamber 11 to pass into the work port 12. Any suitable device connected to the work port 12 will then be subject to atmospheric pressure. Upon energizing the windings 27 of the solenoid motor the core or armature 39 moves downwardly (Fig. 1) against the compression spring 49 and the mid-point of its travel is illustrated in Fig. 2. There it will be noted that each sealing ring 44 and 46 is in contact with its seat, thus sealing off flow from the atmosphere port 14 before the valve is opened to the vacuum port 13. Continued movement of the armature 39 results in the opening shown in Fig. 3 wherein the atmosphere seal 46 is resiliently compressed, giving rise to a clearance between the vacuum seal 44 and its seat 19. The vacuum port 13 is thereupon communicated to the work port 12 with a minimum of lost air volume in the valve itself.

It will be apparent that the invention provides a valve of minimum lost air volume without the use of sliding parts. There are no sliding joints giving rise to wear and short life and attendant leakage. The only joint within the valve itself is that between the stem 38 and the plunger 37 and this, of course, could be avoided by merely tapping a hole in the plunger that did not pass completely through it. The sealing rings 44 and 46 are vulcanized to the plunger thus avoiding leakage at that point. Aside from the compression spring 49 there is only a single moving unit in the entire valve, that is, the plunger 37 and the sealing rings attached thereto. Parts of the solenoid motor move to effect such movement of valve parts.

Having described the invention with respect to a presently preferred embodiment thereof we do not limit ourselves to this embodiment as it is illustrative merely of the invention and not definitive. Various modifications will occur to those skilled in the art and we do not limit ourselves to the embodiment shown or described but claim all such modifications as fall within the true spirit and scope of the invention.

We claim:

1. A valve comprising: a valve housing defining a valve chamber having oppositely disposed annular valve seats and having a work port communicating with the chamber, a vacuum port at the interior of one valve seat and an atmosphere port at the interior of the other valve seat; a plunger reciprocable between the vacuum and atmosphere ports and having flat faces opposite said ports; a ring seal of resilient rubber-like material disposed on each face of the plunger and having a triangular cross section secured by the triangle base to the plunger, the assembly of said plunger and ring seals having a dimension along the plunger reciprocation axis at least as great as the distance between said vacuum port and said atmosphere port; and means for reciprocating the plunger between the valve seats; whereby during reciprocation of said plunger from one valve seat to the other, the ring seals engage both valve seats momentarily to prevent any flow from the atmosphere port to the vacuum port, and thereafter one seal is resiliently compressed to provide a clearance at the other seal, and the triangular cross section gives rise to maximum seal deflection with minimum valve actuating effort.

2. A valve comprising: a valve housing defining a valve chamber having oppositely disposed annular valve seats that are parallel to each other and having in communication with the chamber a work port, a vacuum port at the interior of one valve seat, and an atmosphere port at the interior of the other valve seat; a unitary double headed movant element movable between the valve seats and having a solid plunger with a face opposite each valve seat and having ring seals of triangular cross section bonded to each plunger face at the base of the triangle so that the triangle apex projects outwardly to contact on the associated valve seat; an actuating stem secured to the movant element with a solid airtight connection and projecting through said atmosphere port; and a spring normally urging the movant element to seat one valve ring seal on the vacuum port seat and compressing it sufficiently to permit clearance between the other seat and the other ring seal, the movant element having a dimension parallel to the path of movement substantially the same as the dimensions betwen the valve seats, whereby actuation of the movant element against the spring will first seal off both ports and will then compress the other seal on the atmosphere seat to create a clearance between said one ring seal and the vacuum port.

References Cited in the file of this patent

UNITED STATES PATENTS

| | | |
|---|---|---|
| 583,632 | Roesch | June 1, 1897 |
| 793,463 | McDonald | June 27, 1905 |
| 1,193,036 | McElroy | Aug. 1, 1916 |
| 1,793,659 | Wilson | Feb. 1, 1931 |
| 2,047,319 | Exley | July 14, 1936 |
| 2,152,084 | Paine | Mar. 28, 1939 |
| 2,218,662 | Smith | Oct. 22, 1940 |
| 2,343,265 | Price | Mar. 7, 1944 |
| 2,620,822 | Peterson | Dec. 9, 1952 |

FOREIGN PATENTS

| | | |
|---|---|---|
| 12,911 | Great Britain | May 18, 1905 |
| 732,831 | Germany | Mar. 12, 1943 |
| 578,932 | Great Britain | July 17, 1946 |